JOHN CADMAN.

Improvement in Eye-Glasses.

No. 127,459.  Patented June 4, 1872.

No. 127,459

UNITED STATES PATENT OFFICE.

JOHN CADMAN, OF CHATHAM VILLAGE, NEW YORK.

IMPROVEMENT IN EYE-GLASSES.

Specification forming part of Letters Patent No. 127,459, dated June 4, 1872.

Specification describing a new and useful Improvement in Eye-Glasses, invented by JOHN CADMAN, of Chatham Village, in the county of Columbia and State of New York.

Figure 1:
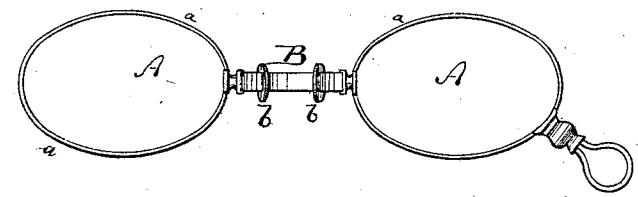
Figure 2:
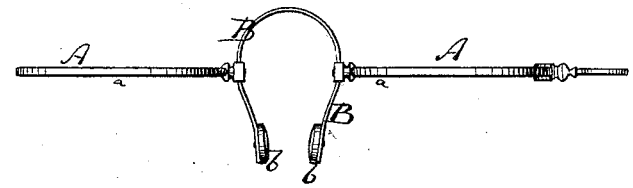

Figure 1 represents a face view of my improved eye-glass. Fig. 2 is a top view of the same.

Similar letters of reference indicate corresponding parts.

This invention relates to a new manner of arranging the springs on eye-glasses, with an object of introducing a more rational mode of holding them to the nose than that at present in vogue. The invention consists in setting the glasses at nearly a right angle to the spring, so that the latter may clamp the nose directly between the eyes at the thin part, and not at the lower fleshy part, as heretofore, which more or less interferes with the process of breathing.

A A in the drawing are the two glasses, of suitable form, fitted into frames $a\ a$, of suitable material. These frames $a$ are connected with the spring B in such manner that the spring will be nearly or entirely at a right angle to the glasses, as is clearly shown in Fig. 2. Suitable bolsters $b\ b$ may be applied to the ends of the spring, to furnish proper retaining-surfaces.

This spring will be held on the nose directly between the eyes, thereby retaining the glasses in the right position and without difficulty.

Having thus described my invention, I claim as new and desire to secure by Letters Patent—

The combination, with the glasses A A, of an intermediate spring, B, placed at right angles thereto, in the manner shown and described.

JOHN CADMAN.

Witnesses:
 H. W. GOTT,
 WM. H. SHAVER.